United States Patent
Pascual Leo et al.

(10) Patent No.: US 8,560,486 B2
(45) Date of Patent: Oct. 15, 2013

(54) CONTENT RECOMMENDATION METHOD AND SYSTEM BASED ON PSYCHOLOGICAL FACTORS FROM A USE PROFILE

(75) Inventors: Juan Moisés Pascual Leo, Madrid (ES); Enrique Frías Martínez, Madrid (ES)

(73) Assignee: Telefonica, S.A., Madrid (ES)

( * ) Notice: Subject to any disclaimer, the term of this patent is extended or adjusted under 35 U.S.C. 154(b) by 493 days.

(21) Appl. No.: 12/874,709

(22) Filed: Sep. 2, 2010

(65) Prior Publication Data
US 2012/0059785 A1     Mar. 8, 2012

(51) Int. Cl.
*G06F 17/00* (2006.01)
*G06N 5/02* (2006.01)

(52) U.S. Cl.
USPC .......................................................... 706/50

(58) Field of Classification Search
USPC ............................... 706/50, 46, 45, 62
See application file for complete search history.

(56) References Cited

U.S. PATENT DOCUMENTS

| | | | | |
|---|---|---|---|---|
| 2006/0123428 | A1* | 6/2006 | Burns | 719/318 |
| 2007/0192106 | A1* | 8/2007 | Zilca | 704/270 |
| 2007/0239724 | A1* | 10/2007 | Ramer et al. | 707/10 |
| 2008/0281952 | A1* | 11/2008 | Fedotenko | 709/223 |

OTHER PUBLICATIONS

Nunes, "Recommender Systems based on Personality Traits", Academie de Montpellier, Universite Montpellier 2, Sciences et Techniques du Languedoc, tel-00348370, version 1—Dec. 18, 2008.*

* cited by examiner

*Primary Examiner* — Jeffrey A Gaffin
*Assistant Examiner* — Ilya Traktovenko
(74) *Attorney, Agent, or Firm* — Sughrue Mion, PLLC

(57) ABSTRACT

A content recommendation method and system based on psychological factors from a consumption profile of a user which is applied in a website for downloading contents through a mobile telephone communications network includes detecting the consumption profile of the user that accesses the website for downloading contents, using a psychographics driver to calculate a psychological profile of the user according to five super traits of a Big Five model, the psychological profile being stored for use in a current query and subsequent queries, and cross-matching the psychological profile and a content data matrix, predefined in a content database, and obtaining as a result of the cross-matching a preferred access of the user to those contents which best adapt to the psychological profile of the user.

7 Claims, 1 Drawing Sheet

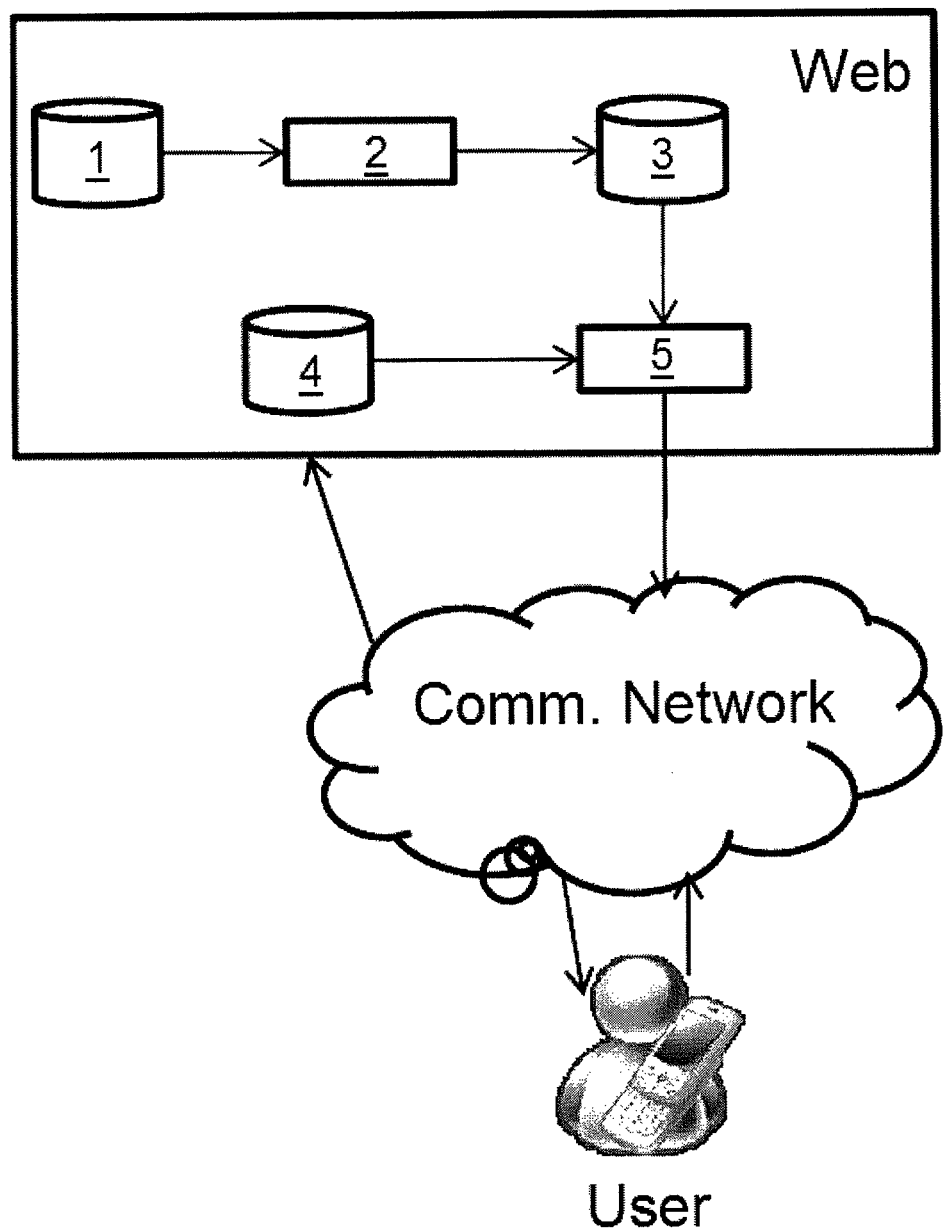

CONTENT RECOMMENDATION METHOD AND SYSTEM BASED ON PSYCHOLOGICAL FACTORS FROM A USE PROFILE

OBJECT OF THE INVENTION

The object of the present invention is a content recommendation method and system, wherein said recommendations are based on the calculation of a psychological profile from the use profile of mobile telephony users, said calculation being based on the psychological model known as the big five.

STATE OF THE ART

The personality is the ultimate source of human conduct and is responsible for most human behaviours in interaction with environmental factors.

The personality is responsible for the psychological similarities and differences among human beings: it makes us seem alike in many behavioural aspects, but it also differentiates us from others [1].

The founder of the dispositional strategy, Gordon Allport, did not think that traits were physical entities, like glands and organs, but rather he believed that psychological traits are actual attributes of people which serve to explain behaviour, rather than just describe it. For example, imagine that a five year old girl and a twenty-five year old woman are asked to lift a 10 kilo weight. If it is assumed that both of them are motivated, anyone would say that the woman will do it and that the child will not. The reason would be because the woman is stronger than the girl. The difference of strength is an actual characteristic of the two. Therefore, indicating that the woman is much stronger than the girl explains why the woman could perform the task and the girl could not. Similarly, trait theorists believe that it is legitimate to state that when one behaves aggressively it is because one has an aggressive trait [2].

According to Allport, when graphically represented for distribution. In other words, when tracing the scores of a large sample on a graph, a bell curve is generated. Most cases are clustered in the centre as the average score, while the high and low scores are located at the outermost positions. These distributions are observed more or less in all the "super traits" [3].

Before defining each of the super traits of the Big Five model (Extraversion, Agreeableness, Emotional Stability, Openness and Conscientiousness), it is necessary to differentiate between traits and facets:

Traits are general internal predispositions to behave in a relatively consistent (in different situations and places) and relatively stable (on different occasions) manner. One does not always behave in the same manner, but one tends to do so in most situations and over time.

Facets are the more specific characteristics which are clustered under a specific trait or dimension. They allow qualifying the descriptions of the personality of an individual.

The facets defining the five super traits of the Big Five model are the following:

| Agreeableness | Conscientiousness | Extraversion | Openness | Emotional stability |
|---|---|---|---|---|
| Empathetic Honest | Non-impulsive Organised | Active Sociable | Creative Idealist | Nervous Irritable |
| Altruistic Conciliatory Modest Sensitive | Meticulous Disciplined Reliable | Assertive Thrill seeker Talkative | Spontaneous Liberal Imaginative Tolerant | Worried Unstable Depressed Negative Timid |

It is considered that the use of the mobile telephone, i.e., how the user interacts with the device, has a direct effect on the definition of the personality traits of the individual. In addition to the Big Five model being well tested and proven in the world of psychology [4] [5], it has a series of advantages: (i) it is easy to put into operation; (ii) it is a universal model; (iii) it is stable over time; and (iv) it is easy to determine traits in each factor.

Over 40 years ago, the psychologist Warren Norman applied a factor analysis to a number of peer nomination personality ratings. Then in 1963 [6], Norman extracted five main factors: surgency (neologism equivalent to extraversion), agreeableness, conscientiousness, emotional stability (which coincides with the lower pole of Eysenck's neuroticism) and culture. Later researchers have confirmed time and again that the five-factor model takes into account the domain level of the dispositional terms that adults use to classify the personality of others [7] [8] [9].

The most important difference between the names of factors of the now popular McCrae and Costa model [8] and of the prior scheme of Norman's five factors relates to the dimension referred to as culture. McCrae and Costa observed that this factor has few factor loads in the points relating to intelligence or education, but many factor loads in the scores of originality, creativity, independence and boldness; therefore, they referred to it as openness (O). Though the names are not identical, the same five factors seem to come up in study after study (take into account that in factor analysis, the naming of factors is always a subjective process).

Robert McCrae and Paul Costa extended the importance of the five-factor model (FFM) for the psychology of personality dispositions upon demonstrating that the same structure is also applied to the questionnaires, the personal scores and the personality reports of the observer. The fact that the same set of five factors comes up in all these different data sources lends tremendous support to the assertion that they are important and underlying dimensions through which it is possible to comprehend individual differences of the adult personality [10]. It has been demonstrated that the "big five" appear not only among adults, but also in children and adolescents from seven to 17 years of age [11]. Paunonen and Jackson [12] analyzed the underlying structure of Jackson's own personality inventory ([13], [14]) and discovered that it could be understood in terms of the five factors of the FFM.

McCrae [15] recently wrote that:

"The FFM contends that the common divergences among virtually all personality trait constructs can be summarised in terms of five recurring factors of neuroticism, extraversion, openness to experience [also called experiential openness or simply openness], agreeableness and conscientiousness [ . . . . ] Thus, FFM offers a powerful conceptual tool to distinguish among similar name constructs and to recognise the apparently different construct similarities."

There are other publications [16] which, though based on behaviour analysis by means of the Big Five model based on telephone behaviour for the study, do not analyze actual telephony events of the user, but rather surveys as to the user's habits in telephone communication.

Most publications which develop inferences from the psychological profile using the Big Five model do so based on a previously developed psychological test and surveys [16], but none of them calculates them based on the actual telephone use profile, as is the object of the present invention.

Literature:

[1] SCHULTZ, D. P. and SCHULTZ, S. E. (2003): "*Teorias de la Personalidad*". Madrid: Ed. Thomson.

[2] ALLPORT, G. W. (1955): "Becoming: Basic considerations for a psychology of personality". New Haven: Yale University Press.

[3] ALLPORT, G. W. (1966): "Traits revisited". American Psychologist, 21, 1-10.

[4] McCRAE, R. R. and COSTA, P. T. (1997): "Personality Trait Structure as a human universal". American Psychologist, 52, 509-516.

[5] McCRAE, R. R. and COSTA, P. T. (1987): "Validation of the five-factor model of personality across instruments and observers". Journal of Personality and Social Psychology, 52, 81-90.

[6] NORMAN, W. T. (1963): "Toward an adequate taxonomy of personality attributes: Replicated factor structure in peer nomination personality ratings". Journal of Abnormal and Social Psychology, 66, 574-583.

[7] DIGMAN, J. M. AND INOUYE, J. (1986): "Further specification of the five robust factors of personality". Journal of Personality and Social Psychology, 50, 116-123.

[8] GOLDBERG, L. R. (1990): "An alternative description of personality: the big five factor structure". Journal of Personality and Social Psychology, 59, 1216-1229.

[9] NOLLER, P., LAW, H. and COMREY, A. (1987): "Cattell, Comrey, and Eysenck personality factors compared: more evidence for the five robust factors?" Journal of Personality and Social Psychology, 53, 775-782.

[10] McCRAE, R. R. and COSTA, P. T. (1985): "Comparison of the EPI and psychoticism scales with measures of the five-factor model of personality". Personality and Individual Differences, 6, 587-597.

[11] DIGMAN, J. M. (1989): "Five robust trait dimensions: Development, stability, and utility". Journal of Personality, 57, 195-214.

[12] PAUNONEN, S. V. and JACKSON, D. N. (1996): "The Jackson personality inventory and the five-factor model of personality". Journal of Research in Personality, 30, 42-59.

[13] JACKSON, D. N. (1976): "Jackson Personality Inventory Manual". Port Huron: Research Psychologists Press.

[14] JACKSON, D. N. (1994): "Jackson Personality Systems.

[15] McCRAE, R. R. (1996): "Social consequences of experiential openness". Psychological Bulletin, 120, 323-337

[16] "Size matters: variation in personal network size, personality and effect on information transmission", Yu-En Lu*, Sam Roberts, Petro Lió, Robin Duunbar, and Jon Crowncroft. 2009 International Conference on Computational Science and Engineering.

DESCRIPTION OF THE INVENTION

The object of the present invention is the development of a content recommendation method using a series of mathematical—psychological instruments in order to be able to infer the Big Five score of people from a plurality of measurements relating to the use of the telephone, for the purpose of adapting the content of mobile users who access the operator's website, to his previously calculated psychological profile.

More specifically, in a first aspect of the invention the content recommendation method based on psychological factors from a use profile is characterised in that it comprises the steps of: (i) a first step of the user accessing a website for downloads and detection of the consumption profile of said user; (ii) a second step in which the psychographics driver calculates the user according to the five super traits of the Big Five model, said profile being stored for its use in the current query and subsequent queries; and (iii) a third step in which the psychological profile resulting from the second step and a content data matrix, predefined in a content database, are cross-matched, obtaining as a result of the cross-matching the preferred access of the user to those contents which best adapt to his psychological profile.

In a second aspect of the invention, the content recommendation system based on psychological factors from a use profile comprises: (a) a website for downloads that is accessible for the user, where said site comprises means configured for the detection of his consumption profile; (b) a psychographics driver configured to calculate his profile in the five super traits of the Big Five model, said profile being stored in a first database, said data being accessible for the current query and subsequent queries; and (c) means configured to cross-match the psychological profile stored in the first database and the data contained in a second content database; all such that access preferably to those contents which best adapt to the calculated psychological profile is granted to the user.

In a third aspect of the invention, the communications network implementing the method or the system described above is claimed.

The identification of a psychological profile deduced through the telephone use profile provides enormous advantages when predicting possible customer events (such as prediction of purchase, of abandonment, etc.), and in the preparation of commercial actions (correct manner of communication with the customer, frequency of communication with the customer, etc.)

Throughout the description and claims the word "comprise" and variations of the word, are not intended to exclude other technical features, additives, components, or steps. Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

BRIEF DESCRIPTION OF THE DRAWINGS

FIG. 1 shows a scheme of the content recommendation method based on psychological factors from a use profile, object of the present invention.

PREFERRED EMBODIMENTS

The logical model of the present invention is based on three basic steps: (i) a first step of the user accessing a website for downloads and the detection of his consumption profile (1); (ii) a second step in which the psychographics driver (2) calculates his profile in the five super traits of the Big Five model, said profile being stored (3) for future queries, in addition to the current query; and (iii) a third step in which the psychological profile resulting from the second step (3) and the content database (4) are cross-matched (5), giving the customer access mainly to those contents which best adapt to his psychological profile.

The first step would correspond with capturing and processing events in a website for downloading contents in a 3G-type telecommunications network or better, in which the events which, as a result of a prior analysis, have been identified as indicators which explain the factors included in theoretical Big Five model, are captured from the information systems. The information systems used as sources are:

1) Voice traffic, SMS, MMS and broadband data.
2) Failures and calls to a Call Centre
3) Characterization of the user (age, sex, etc.) and monthly invoicing.

The processing of the captured events is used to obtain an intermediate representation of the behaviour of the user from which, and in the second step, each user is assigned his personality values corresponding to the Big Five model.

The result of this first step is assigning to each of the users a vector which contains the aggregate values of a series of events. The types of aggregate events which are used and the justification of why it is interesting for obtaining the psychological model are presented below. The level of aggregation of the events can be 3 or 6 months, depending on the practical embodiment used.

| TYPE OF EVENT | JUSTIFICATION |
| --- | --- |
| Different telephone numbers to which the user has sent SMS (during a 6-month period) | Provides information about the user's social network |
| Different telephone numbers from which the user has received calls in his mobile telephone (during a 6-month period), with the exception of the numbers from which he has received a single call | Provides information about the user's social network |
| Total number of calls which the user has made from his mobile telephone (during a 6-month period) | Provides information about the user's communication preferences |
| Total number of calls which the user has received in his mobile telephone (during a 6-month period) | Provides information about the user's communication preferences |
| Total duration of the calls which the user has made from his mobile telephone (during a 6-month period) | Provides information about the user's communication preferences |
| Mean duration of the calls which the user has made from his mobile telephone (during a 6-month period) | Provides information about the user's communication preferences |
| Number of SMS which the user has sent (during a 6-month period) | Provides information about the user's communication preferences |
| Number of MMS which the user has sent (during a 6-month period) | Provides information about the user's communication preferences |
| Range of the user's mobile terminal | Provides information about the user's relationship with ICTs |
| Total number of times the user has changed his mobile terminal (during a minimum 6-month period: explore the possibility of increasing the duration of said period) | Provides information about the user's need for change and about his relationship with ICTs |
| Total invoiced by the user broken down by services | Provides information about the user's relationship with ICTs |
| Mobile calling hours. The total number of calls made (during a 6-month period) in different time slots would be specified for each user. Specifically, in 2-hour blocks (00:00-02:00; 02:00-04:00 . . . 22:00-00:00) | Provides information about the user's activity cycles |
| Internet connection hours. The total number of connections made (during a 6-month period) in different time slots would be specified for each user. Specifically, in 2-hour blocks (00:00-02:00; 02:00-04:00 . . . 22:00-00:00) | Provides information about the user's activity cycles |
| WAP connection hours. The total number of connections made (during a 6-month period) in different time slots would be specified for each user. Specifically, in 2-hour blocks (00:00-02:00; 02:00-04:00 . . . 22:00-00:00) | Provides information about the user's activity cycles |
| Total number of downloads performed by the user, broken down into games, music, etc. | Provides information about the user's need for change and about his degree of openness |
| Number of times the user has called the Customer Service Centres (during a 6-month period) | Provides information about the degree of stability |
| Total number of different cells per user (during a 6-month period) | Provides information about the degree of openness |
| Total number of advanced services | Provides information about the |

-continued

| TYPE OF EVENT | JUSTIFICATION |
|---|---|
| contracted by the user | degree of openness |
| Contracting the added value services | Provides information about the degree of openness |

In the second step, to calculate the Big Five super trait, first it is necessary to determine the set of business variables associated with each of the super traits, the theoretical weight thereof, and the reliability index calculated from the data.

The tables for each psychographic super trait with the table of variables obtained in the previous step and the theoretical weights (WT) associated with each of these variables are shown below.

TABLE I

Agreeableness super trait.

| AGREEABLENESS | WT |
|---|---|
| Different telephone numbers which the user has called from his mobile telephone, with the exception of the numbers he has called only once. Provides information about the user's social network | 1 |
| Different telephone numbers which the user has called from his mobile telephone, with the exception of the numbers he has called only once. Provides information about the user's social network | 1 |
| Different telephone numbers to which the user has sent MMS. Provides information about the user's social network | 1 |
| Different telephone numbers from which the user has received calls in his mobile telephone, with the exception of the numbers from which he has received a single call. Provides information about the user's social network | 1 |
| Mean duration of the calls which the user has made from his mobile telephone. Provides information about the user's communication preferences | −0.5 |
| Mean duration of the calls which the user has received in his mobile telephone. Provides information about the user's communication preferences | −0.5 |
| Total number of MMS recipients which the user has received in his telephone. Provides information about the user's communication preferences | 0.75 |
| Total number of SMS recipients which the user has received in his telephone. Provides information about the user's communication preferences | 0.75 |

TABLE II

Conscientiousness super trait

| CONSCIENTIOUSNESS | WT |
|---|---|
| Total number of times the user has changed his mobile terminal. The number of terminals from which he has called more than 10 times is counted. Provides information about the user's need for change and about his relationship with ICTs | −0.75 |
| Mobile calling hours. The total number of calls made will be specified for each user. Provides information about the user's activity cycles. M-F 00:00-02:00 | −0.5 |
| Mobile calling hours. The total number of calls made will be specified for each user. Provides information about the user's activity cycles. M-F 02:00-04:00 | −0.5 |
| Mobile calling hours. The total number of calls made will be specified for each user. Provides information about the user's activity cycles. M-F 04:00-06:00 | −0.5 |
| Number of times the user has called the CRC or CSC: information of MOVILES. Provides information about the degree of stability. | 0.5 |

TABLE II-continued

Conscientiousness super trait

| CONSCIENTIOUSNESS | WT |
|---|---|
| Mobile message hours. The total number of SMS sent in different time slots will be specified for each user. Provides information about the user's activity cycles. M-F 00:00-02:00 | −0.25 |
| Mobile message hours. The total number of SMS sent in different time slots will be specified for each user. Provides information about the user's activity cycles. M-F 02:00-04:00 | −0.25 |

TABLE III

Extraversion super trait

| EXTRAVERSION | WT |
|---|---|
| Different telephone numbers which the user has called from his mobile telephone, with the exception of the numbers he has called only once. Provides information about the user's social network | 1 |
| Different telephone numbers from which the user has received calls in his mobile telephone, with the exception of the numbers from which he has received a single call. Provides information about the user's social network | 1 |
| Mean duration of the calls which the user has made from his mobile telephone. Provides information about the user's communication preferences | −0.75 |
| Ratio of the variables: Total number of calls made and Mean duration of the calls made for the mobile telephone | 1 |
| Ratio of the variables: Number of calls made from the mobile telephone and Number of SMS sent | 1 |
| Ratio of the variables: Number of calls made and Number of calls received for the mobile telephone | 1 |
| Ratio of the variables: Calls made in the 22 h-02 h (night time) and 06 h-10 h (daytime) slot for the mobile telephone | 0.75 |
| Ratio of the variables: SMS messages sent in the 22 h-02 h (night time) and 06 h-10 h (daytime) slot. | 0.75 |

TABLE IV

Openness super trait

| OPENNESS | WT |
|---|---|
| Number of MMS which the user has sent. Provides information about the user's communication preferences | 1 |
| Total number of times the user has changed his mobile terminal. The number of terminals from which he has called more than 10 times is counted. Provides information about the user's need for change and about his relationship with ICTs | 1 |
| Total invoiced by the user broken down by services. MÓVIL - amount for voice calls | 0.5 |
| Total invoiced by the user broken down by services. MÓVIL - amount for MMS | 1 |
| Total number of downloads performed by the user. Provides information about the user's need for change and about his degree of openness. | 0.75 |

TABLE IV-continued

Openness super trait

| OPENNESS | WT |
|---|---|
| Total number of downloads performed by the user. Provides information about the user's need for change and about his degree of openness. | 0.75 |
| Total number of different cells per user. Provides information about the degree of openness. | 1 |
| Total number of advanced services contracted by the user: seconds connected to EMOCION. Provides information about the degree of openness. | 1 |

TABLE V

Emotional stability super trait

| EMOTIONAL STABILITY | WT |
|---|---|
| Mean duration of the calls which the user has made from his mobile telephone. Provides information about the user's communication preferences | 1 |
| Number of SMS which the user has sent. Provides information about the user's communication preferences | −0.25 |
| Number of MMS which the user has sent. Provides information about the user's communication preferences | 0.75 |
| Total invoiced by the user broken down by services. MÓVIL - amount for voice calls | −0.75 |
| Total number of downloads performed by the user. Provides information about the user's need for change and about his degree of openness. | −1 |
| Total number of downloads performed by the user. Provides information about the user's need for change and about his degree of openness. | −1 |
| Number of times the user has called the CRC or CSC: information of MOVILES. Provides information about the degree of stability. | −1 |
| Total number of advanced services contracted by the user: seconds connected to EMOCION. Provides information about the degree of openness. | 0.75 |
| Ratio of the variables: Number of calls made and Number of calls received for the mobile telephone | −1 |

Each of the variables listed is assigned a value which represents the reliability weight (WR) of that variable which is defined as the number of individuals who have a value in the variable divided by the total number of individuals.

Once the theoretical weight and the reliability weight are assigned to each variable in each of the super traits, the linear equation which calculates the normalised score between −1 and 1 for each individual in each of the super traits of the Big Five model is described, wherein it should be indicated that said function is unique for all the super traits:

$$C_i = \frac{\sum_{j=1}^{k} \left[ WT_j \cdot \left( \frac{x_{ji} - \overline{X}_j}{s_j(z_{max} - z_{min})} \right) \cdot WR_j \right]}{\sum_{j=1}^{k} (D_{ji} \cdot |WT_j| \cdot WR_j \cdot |E_j|)}$$

where:
$C_i$ is the score in each super trait of the case (customer) i.
k is the total number of variables from which the extraversion factor will be calculated and which were described in the table corresponding to that super trait.
$RT_j$: is the weight (between 0 and 1) of the variable j described in the corresponding tables.
$x_{ji}$ is the value of the case (customer) i in the variable j.
$\overline{X}_j$ is the mean of the variable j.
$s_j$ is the standard deviation of the variable j.
$z_{max}$ is the standard score of the maximum value of the variable j:

$$\frac{x_{jmax} - \overline{X}_j}{s_j}$$

$z_{min}$ is the standard score of the minimum value of the variable j:

$$\frac{x_{jmin} - \overline{X}_j}{s_j}$$

$WR_j$: Weight (between 0 and 1) of the variable j which represents its Reliability Weight.
$D_{ji}$: Binary variable taking the value 1 if the case (customer) i has data in variable j, and the value 0 if it does not.
$E_j$: Absolute value of a defined scale factor.
If $x_{ji} \geq \overline{X}_j$, then $$E_j = \frac{z_{max}}{(z_{max} - z_{min})}$$

If $x_{ji} < \overline{X}_j$, then $$E_j = \frac{z_{min}}{(z_{max} - z_{min})}$$

To conclude the indicated second step, the results of the calculation of the super traits are stored in a database (3) the data of which are available for being used a recommendation driver which is outside the scope of the present invention.

The third step of the method object of the present invention is where the psychological profile resulting from the second step and stored in the database (3) and the content database (4) are cross-matched (5), giving the customer access mainly to those contents which best adapt to his psychological profile.

The content database (4) must be previously defined. The necessary information will be the following:
Content code.
Range of values for agreeableness for the content code.
Range of values for conscientiousness for the content code.
Range of values for extraversion for the content code.
Range of values for openness for the content code.
Range of emotional stability for the content code.

Finally, the cross-matching (5) is performed between the psychological profiles calculated and stored in the database (3) within the second step and the matrix defined in the content database (4), providing the user with the recommendation of determined contents which could be enjoyed on-line or once downloaded, depending on the needs and characteristics thereof; for this reason said invention has been defined within a third generation (3G) network.

The invention claimed is:

1. A content recommendation method based on psychological factors from a consumption profile of a user which is applied in a website for downloading contents through a mobile telephone communications network, the method comprising:
  (i) detecting the consumption profile of the user that accesses the website for downloading contents;
  (ii) using a psychographics driver to calculate a psychological profile of the user according to five super traits of a Big Five model, said psychological profile being stored for use in a current query and subsequent queries; and (iii) cross-matching the psychological profile resulting from (ii) and a content data matrix, predefined in a content database, and obtaining as a result of the cross-matching a preferred access of the user to those contents which best adapt to the psychological profile of the user, wherein in (ii), to calculate the five super traits of the Big Five model, a set of business variables associated with each of the five super rafts is determined according to results obtained in (i), a theoretical weight and a reliability weight are assigned to each variable in the set of business variables associated with each of the five super traits based on a number of individuals who have a value in the variable divided by a total number of individuals, and wherein once the theoretical weight and the reliability weight are assigned to each variable in the set of the business variables associated with each of the five super traits, a linear equation is used to calculate a normalized score between −1 and 1 for each individual in each of the five super traits of the Big Five model, wherein said linear equation is unique for each of the five super traits:

$$C_i = \frac{\sum_{j=1}^{k}\left[WT_j \cdot \left(\frac{x_{ji} - \overline{X}_j}{s_j(z_{max} - z_{min})}\right) \cdot WR_j\right]}{\sum_{j=1}^{k}(D_{ji} \cdot |WT_j| \cdot WR_j \cdot |E_j|)}$$

where:
$C_i$ is a score in each super trait of a user i;
k is a total number of variables from which the super trait will be calculated;
$WT_j$ is a weight for a variable j;
$x_{ji}$ is a value of the user i in the variable j;
$\overline{X}_j$ is a mean of the variable j;
$s_j$ is a standard deviation of the variable j;
$z_{max}$ is a standard score of the maximum value of the variable j;
$z_{min}$ is a standard score of the minimum value of the variable j;
$D_{ji}$ is a binary variable that is 1 if the user i has data in the variable j and 0 if the user i does not have data in the variable j;
$WR_j$ is a reliability weight of the variable j; and
$E_j$ is an absolute value of a defined scale factor.

2. The method according to claim 1, wherein in (i) events which, as a result of a prior analysis, have been identified as indicators which explain the psychological factors included in the Big Five model, are captured from information systems; and wherein said information systems used as sources are at least one selected from: (a) voice traffic, SMS, MMS and broadband data; (b) failures and calls to a call center; and (c) characteristics of the user and monthly invoicing.

3. The method according to claim 1, wherein in (i), processing of captured events is used to obtain an intermediate representation of behavior of the user in a form of a vector which contains aggregate values of a series of events from which, in (ii) the user is assigned personality values corresponding to the Big Five model.

4. The method according to claim 1, wherein the content data matrix comprises at least content code, a range of values for agreeableness for the content code, a range of values for conscientiousness for the content code, a range of values for extraversion for the content code, a range of values for openness for the content code, and a range of values for emotional stability for the content code.

5. The method according to claim 1, wherein in (iii), the data resulting from (ii) and the content data matrix are cross-matched, providing the user with a recommendation of determined contents which could be enjoyed on-line or once downloaded, depending on the needs and characteristics thereof.

6. A content recommendation system based on psychological factors from a consumption profile of a user, the system comprising:

(a) a website configured to provide downloadable contents that is accessible to the user, where said website detects the consumption profile of the user;

(b) a psychographics driver, running on a processor, configured to calculate a psychological profile of the user according to five super traits of a Big Five model, said psychological profile being stored in a first database and being accessible for a current query and subsequent queries; and (c) a cross-matching unit configured to cross-match the psychological profile stored in the first database and data contained in a second content database and to provide access preferably to those contents which best adapt to the calculated psychological profile to the user, wherein the psychographics driver is configured to determine a set of business variables associated with each of the five super traits according to the consumption profile of the user detected by the website and to assign a theoretical weight and a reliability weight to each variable in the set of business variables associated with each of the five super traits based on a number of individuals who have a value in the variable divided by a total number of individuals, and wherein once the theoretical weight and the reliability weight are assigned to each variable in the set of the business variables associated with each of the five super traits, the psychographics deriver uses a linear equation to calculate a normalized score between −1 and 1 for each individual in each of the five super traits of the Big Five model, wherein said linear equation is unique for each of the five super traits:

$$C_i = \frac{\sum_{j=1}^{k}\left[WT_j \cdot \left(\frac{x_{ji} - \overline{X}_j}{s_j(z_{max} - z_{min})}\right) \cdot WR_j\right]}{\sum_{j=1}^{k}(D_{ji} \cdot |WT_j| \cdot WR_j \cdot |E_j|)}$$

where:
$C_i$ is a score in each super trait of a user i;
k is a total number of variables from which the super trait will be calculated;
$WT_j$ is a weight for a variable j;
$x_{ji}$ is a value of the user i in the variable j;
$\overline{X}_j$ is a mean of the variable j;
$s_j$ is a standard deviation of the variable j;
$z_{max}$ is a standard score of the maximum value of the variable j;
$z_{min}$ is a standard score of the minimum value of the variable j;

$D_{ji}$ is a binary variable that is 1 if the user i has data in the variable j and 0 if the user i does not have data in the variable j;

$WR_j$ is a reliability weight of the variable j; and $E_j$ is an absolute value of a defined scale factor.

7. A communications network, comprising the system of claim 6.

* * * * *